United States Patent
Noguchi

(10) Patent No.: US 6,751,633 B2
(45) Date of Patent: Jun. 15, 2004

(54) INFORMATION PROCESSING APPARATUS, INFORMATION TRANSMITTING METHOD, COMPUTER READABLE RECORDING MEDIUM, AND PROGRAM FOR ALLOWING COMPUTER TO EXECUTE THE INFORMATION TRANSMITTING METHOD

(75) Inventor: Yuki Noguchi, Nagoya (JP)

(73) Assignee: Fujitsu Limited, Kawasaki (JP)

( * ) Notice: Subject to any disclaimer, the term of this patent is extended or adjusted under 35 U.S.C. 154(b) by 419 days.

(21) Appl. No.: 09/978,700

(22) Filed: Oct. 18, 2001

(65) Prior Publication Data

US 2002/0124014 A1 Sep. 5, 2002

(30) Foreign Application Priority Data

Mar. 2, 2001 (JP) .................................. 2001-059149

(51) Int. Cl.[7] .................................................. G06F 7/00
(52) U.S. Cl. ......................... 707/104.1; 707/9; 707/10; 707/205
(58) Field of Search ................. 707/1–10, 100–104.1, 707/204

(56) References Cited

U.S. PATENT DOCUMENTS

| | | | | |
|---|---|---|---|---|
| 5,872,926 A | * | 2/1999 | Levac et al. | 709/206 |
| 6,101,526 A | | 8/2000 | Mochizuki | 709/200 |
| 6,249,792 B1 | * | 6/2001 | Zwilling et al. | 707/205 |
| 6,449,635 B1 | * | 9/2002 | Tilden et al. | 709/206 |
| 6,466,968 B2 | * | 10/2002 | Shirai et al. | 709/206 |

FOREIGN PATENT DOCUMENTS

| | | |
|---|---|---|
| EP | 0 860 985 | 8/1998 |
| JP | 10-31636 | 2/1998 |
| JP | 10-233860 | 9/1998 |
| JP | 10-326236 | 12/1998 |
| JP | 11-003299 | 1/1999 |

* cited by examiner

*Primary Examiner*—Greta Robinson
*Assistant Examiner*—Linh Black
(74) *Attorney, Agent, or Firm*—Staas & Halsey LLP

(57) ABSTRACT

An information processing apparatus for transmitting information to a designated destination through a network, such as an Internet, comprises a file capacity judging unit which determines whether or not the capacity of a file which is designated to be transmitted to the destination is larger than a predetermined value, and also comprises a transmitting unit which transmits the file to an accessible storing unit and transmits an address of the storing unit to the designation, instead of transmitting the file, when it is determined that the capacity of the file is larger than the predetermined value.

20 Claims, 13 Drawing Sheets

DISPLAY OF IMAGE FILE

INFORMATION PROCESSING APPARATUS, INFORMATION TRANSMITTING METHOD, COMPUTER READABLE RECORDING MEDIUM, AND PROGRAM FOR ALLOWING COMPUTER TO EXECUTE THE INFORMATION TRANSMITTING METHOD

BACKGROUND OF THE INVENTION

1. Field of the Invention

The present invention relates to an information processing apparatus, an information transmitting method, a computer readable recording medium, and a program for allowing a computer to execute the information transmitting method, for executing information transmission through a network such as the Internet.

In particular, the present invention relates to a method for exchanging several kinds of information (also called data), in a short time and efficiently, by means of e-mail through the Internet, among a plurality of information processing apparatus such as work stations, personal computers, and word processors.

2. Description of the Related Art

In general, when data is transmitted from an information processing apparatus to other one in a network information processing system, the data is transmitted in a form of attached file. The "attached file" means a data file which is a file including data owned by a transmitter (i.e., a user at the transmitting end) and which is transmitted as an attachment to an electronic mail (usually abbreviated to an e-mail). A user at the receiving end who has received this data file can look at the same data file that the user at the transmitting end looked at.

If a capacity (or size) of the file which is to be attached is relatively large, it may burden (or over-load) the hard disk at the receiving end, or the mail server at the transmitting end or receiving end. In this case, the data file is compressed and attached to an e-mail message, or, the data file is copied into a web server or the like manually and then a URL (Uniform Resource Locator) of the data file is sent to the receiving end (in this case, the data file is not attached to an e-mail message). Here, the "URL" is a description method used to identify a location in which a mail server is connected to the Internet, etc., i.e., a location in which the data file is stored.

A first example of conventional network information processing systems for executing information transmission through a network, such as the Internet, has a system configuration wherein an attached file in which a method for making access to a designated file is described is attached to an e-mail message and which is then transmitted to the receiving end as disclosed in the Japanese Unexamined Patent Publication No. 11-3299. In this system configuration, the method for making access to the designated file must be always transmitted by using the e-mail, and thereby an amount of information to be transmitted increases accordingly. Since the attachment of the file in which the method for making access to the designated file is described is executed without any conditions, there may be a case in which an amount of data of the attached file is larger than an amount of data of the file which is to be transmitted, depending on the capacity (file size) of the file which is to be transmitted.

In addition, a second example of conventional network information processing systems has a system configuration wherein an attached file is transmitted by a particular mail server, based on the request of a mail client as disclosed in the Japanese Unexamined Patent Publication No. 10-31636. In this system configuration, the attached file is transmitted independently of the capacity (or size) of the attached file. Therefore, if the capacity of the attached file is larger than the capacity of the specified file, it may burden the mail server. If the software of the mail server is changed in order to avoid the above disadvantage, it becomes impossible for a mail client, which depended on the mail server before the change of the software, to use the mail server.

As stated above, in the first or the second network information processing system, the user transmitting the e-mail makes a copy of the attached file which is to be transmitted into the web server, in order to decrease an amount of data of the attached file and to make the data size of the e-mail smaller. Consequently, it takes much time to transmit the attached file.

If a long URL for the file which has been stored in the web server is input by using a keyboard when sending the URL, an error in the URL often occurs due to a typographical error, etc. If a typographical error occurs, the URL must be sent again, and thereby it may causes an inconvenience to the user at the receiving end.

In more detail, according to the above conventional network information processing systems, a relatively large capacity of the attached file may burden the mail server at the transmitting end or the receiving end, or the hard disk at the receiving end. In order to avoid the above disadvantage, an attached file can be stored in a separate file server which can be referred to, and the URL corresponding to the separate file server is notified to another person at the receiving end.

However, in this case, the following procedures (1) to (3) must be executed manually, in order to register the URL of the file stored location in the file server and notify the above URL to another person. Therefore, it takes much unnecessary time and results in a complicated operation.

(1) Contents of the attached file are converted to a format which can be referred to, and are stored in a separate file server.

(2) The URL of the file storage location is input to the e-mail which is to be transmitted by using a keyboard.

(3) The e-mail is transmitted.

SUMMARY OF THE INVENTION

It is an object of the present invention to provide an information processing apparatus, an information transmitting method, a computer readable recording medium, and a program for allowing a computer to execute the information transmitting method, which can save the transmitter's trouble and reduce the processing load on a mail server even if the capacity of the file which is to be transmitted is relatively large.

In order to attain the above object, the present invention provides an information processing apparatus for transmitting information to a designated destination, the information processing apparatus comprising a file capacity judging unit which determines whether or not the capacity of a file which is designated to be transmitted to the destination is larger than a predetermined value, and also comprising a transmitting unit which transmits the file to an accessible storing unit and transmits an address of the storing unit to the destination, instead of transmitting the file, when it is determined that a capacity of the file is larger than the predetermined value.

Preferably, the information processing apparatus according to the present invention includes a first setting unit which previously sets the address of the storing unit, and the transmitting unit transmits the file which is designated to be transmitted to the address.

Further, preferably, the information processing apparatus according to the present invention includes a second setting unit which sets a password for limiting access to the file stored in the storing unit, and the transmitting unit transmits the password to the destination along with the address of the storing unit.

Further, preferably, the information processing apparatus is connected to a network, transmission of the information is controlled by a mail server connected to the network, and the transmitting unit requests the mail server to transmit the address of the storing unit to the destination.

Further, preferably, the information processing apparatus is connected to a network and transmits the information received, from a mail client connected to the network, to the destination of the information, and the file capacity judging unit determines a capacity of the file which has been included in the information received from the mail client, and the transmitting unit transmits the address of the storing unit to the designation, instead of the file which has been included in the information received from the mail client.

On the other hand, the present invention provides an information transmitting method for transmitting information to a designated destination, the information transmitting method including the step of determining whether or not the capacity of the file which is designated to be transmitted to the destination is larger than a predetermined value, and also including the step of transmitting the file to an accessible storing unit and transmitting an address of the storing unit to the designation, instead of transmitting the file when it is determined that the capacity of the file is larger than the predetermined value.

In addition, the present invention provides a computer readable recording medium which stores a program for allowing a computer to execute determining whether or not the capacity of a file which is designated to be transmitted to a destination is larger than a predetermined value, and to execute transmitting the file to a accessible storing unit and transmitting an address of the storing unit to the destination, instead of transmitting the file, when it is determined that the capacity of the file is larger than the predetermined value.

Further, the present invention provides a program for allowing a computer to execute determining whether or not the capacity of the file which is designated to be transmitted to a destination is larger than a predetermined value, and to execute transmitting the file to an accessible storing unit and transmitting an address of the storing unit to the destination, instead of transmitting the file when it is determined that the capacity of the file is larger than the predetermined value.

Preferably, the program according to the present invention allows the computer to execute designating the file to be transmitted, determining the capacity of the file, and transmitting the address of the storing unit, instead of transmitting the file, provided that the computer is connected to a network, and the transmission of the information is controlled by a mail server connected to the network.

In summary, in the present invention, it is determined whether or not a capacity of the file including the information which is to be transmitted is larger than a predetermined value and, then, according to the result of the determination, the file is transmitted from the mail server, etc., at the transmitting end to the mail server, etc., at the receiving end, or, the file is copied into the storing unit and the address of the storing unit is transmitted from the mail server, etc., at the transmitting end to the mail server, etc., at the receiving end. The address of the storing unit is displayed in an e-mail message, etc., automatically.

In more detail, when it is determined that a capacity of the file which is to be transmitted is the predetermined value or is smaller than the predetermined value, the file is transmitted as it is to a mail server, etc., at the receiving end and, when it is determined that a capacity of the file is larger than the predetermined value, the file is automatically replaced with the address, such as a URL of the storing unit which the file can be referred to, and only the address, such as the URL, is transmitted to the mail server, etc., at the receiving end.

As mentioned above, in the present invention, only when it is determined that the capacity of the file which is to be transmitted is the predetermined value or is smaller than the predetermined value, the file is transmitted from the mail server, etc., at the transmitting end to the mail server, etc., at the receiving end. Therefore, the mail server at the transmitting end or the receiving end is not over-loaded due to the capacity of the file. On the other hand, when the capacity of the file which is to be transmitted is larger than the predetermined value, the file is replaced with the address, such as the URL of the storing unit at which the file can be referred to, and the address, such as the URL, is registered automatically, and therefore, it is not required that the address of the storing unit is registered manually.

In addition, since the address of the storing unit is shown in an e-mail message, etc., automatically, an error in the case in which the address of the storing unit is input with a keyboard, etc., does not happen, and therefore, no inconvenience due to a notification error is caused at the receiving partner.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Configurations and operations of a basic embodiment and a preferred embodiment according to the present invention are described below with reference to the accompanying drawings (FIGS. 1 to 13).

Figure 1:
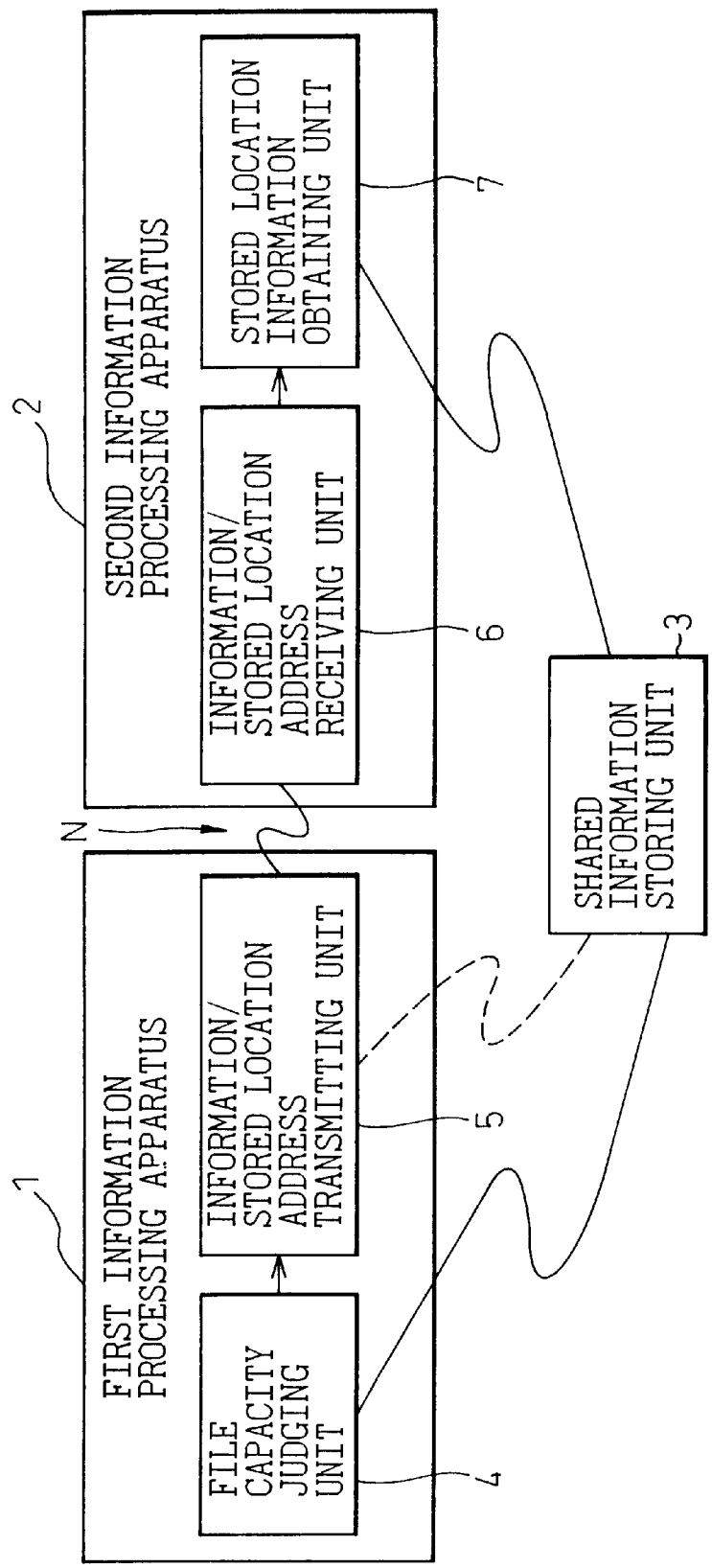
FIG. 1 is a block diagram showing the configuration of a basic embodiment according to the principle of the present invention.

FIG. 1 is a block diagram showing the configuration of a basic embodiment, according to the principle of the present invention, in which the configuration of the basic embodiment comprising a plurality of information processing apparatuses is shown briefly.

The basic embodiment according to the present invention shown in FIG. 1 provides a configuration comprising at least a first information processing apparatus 1 and a second information processing apparatus 2 which process several kinds of information (data), and comprising a shared information storing unit 3 which stores the information included in at least one of the first information processing apparatus 1 and the second information processing apparatus 2 as the shared information, wherein transmission of the information is executed through a network N between the first and second information processing apparatus. In this configuration, the shared information storing unit 3 corresponds to the "storing unit" of the present invention. In FIG. 1, the configuration comprising only two information processing apparatus of the first information processing apparatus 1 and the second information processing apparatus 2 is shown for the sake of simplicity, although the present invention is also applicable to the configuration comprising three or more than three information processing apparatus.

In this information processing system, the first information processing apparatus 1 comprises a file capacity judging unit 4, which determines whether or not a capacity of the file including the predetermined information which is to be transmitted is larger than a predetermined value; and an information/stored location address transmitting unit 5 which transmits either the predetermined information or the address of the storing unit. The information/stored location address transmitting unit 5 corresponds to the "transmitting unit" of the present invention. The information/stored location address transmitting unit 5 transmits the predetermined information from the first information processing apparatus 1 to the second information processing apparatus 2, when it is determined that the capacity of the file is the predetermined value or is smaller than the predetermined value. On the other hand, the information/stored location address transmitting unit 5 transmits the predetermined information to an accessible storing unit (e.g., the shared information storing unit 3) and transmits the address of the storing unit, instead of transmitting the file, when it is determined that the capacity of the file is larger than the predetermined value.

The second information processing apparatus 2 comprises an information/stored location address receiving unit 6 which receives either the predetermined information or the address of the storing unit transmitted from the first information processing apparatus 1, and comprises a stored location information obtaining unit 7 which refers to the shared information storing unit 3 based on the address of the storing unit received by the information/stored location address receiving unit 6, and which obtains the predetermined information stored in the shared information storage unit 3.

Preferably, the first information processing apparatus 1 includes a transmitting mail server which executes the transmitting process for either the predetermined information or the address of the storing unit, and includes a transmitting mail client which requires the transmitting process to the transmitting mail server, wherein the file capacity judging unit 4 is included in at least one of the transmitting mail client and the transmitting mail server, and the information/stored location address transmitting unit 5 is included in at least one of the transmitting mail client and the transmitting mail server.

Further, preferably, the second information processing apparatus 2 includes a receiving mail server which executes the receiving process for either the predetermined information or the address of the storing unit, and includes a receiving mail client which requests the receiving mail server to execute the receiving process, wherein the information/stored location address receiving unit 6 is included in at least one of the receiving mail client and the receiving mail server, and the stored location information obtaining unit 7 is included in the receiving mail client.

Preferably, the first information processing apparatus 1 of the preferred embodiment includes a first setting unit (not shown) which previously sets the address of the storing unit, and the information/stored location address transmitting unit 5 transmits the file which is designated to be transmitted to the address.

Further, preferably, the first information processing apparatus 1 of the preferred embodiment includes a second setting unit (not shown) which sets a password for limiting access to the file stored in the storing unit, and the information/stored location address transmitting unit 5 transmits the password along with the address of the storing unit, to the designated destination.

Further, preferably, the first information processing apparatus 1 and the second information processing apparatus 2 of the preferred embodiment are connected to the network N, and transmission of the information is controlled by the mail server connected to the network N, and the information/stored location address transmitting unit 5 transmits the address of the storing unit to the aforementioned destination.

Further, preferably, the first information processing apparatus 1 and the second information processing apparatus 2 of the preferred embodiment are connected to the network N and transmit the information received, from a mail client connected to the network N, to the destination of the information, and the file capacity judging unit 4 determines the capacity of the file which has been included in the information received from the mail client, and the information/stored location address transmitting unit 5 transmits the address of the storing unit, instead of the file which has been included in the information received from the mail client, to the aforementioned destination.

In the basic embodiment, it is determined whether or not the capacity of the file including the information which is to be transmitted is larger than a predetermined value and, then, according to the result of the determination, the file is transmitted from the mail server at the transmitting end to the mail server at the receiving end, or, the file is copied into the storing unit and the address of the storing unit is transmitted from the mail server at the transmitting end to the mail server at the receiving end.

In more detail, the file is transmitted as it is to the mail server at the receiving end when it is determined that the capacity of the file to be transmitted is the predetermined value or is smaller than the predetermined value. On the other hand, when it is determined that the capacity of the file is larger than the predetermined value, the file is automatically replaced with the address, such as a URL of the storing unit which the file can be referred to, and only the address, such as the URL, is transmitted to the mail server at the receiving end.

Figure 2:
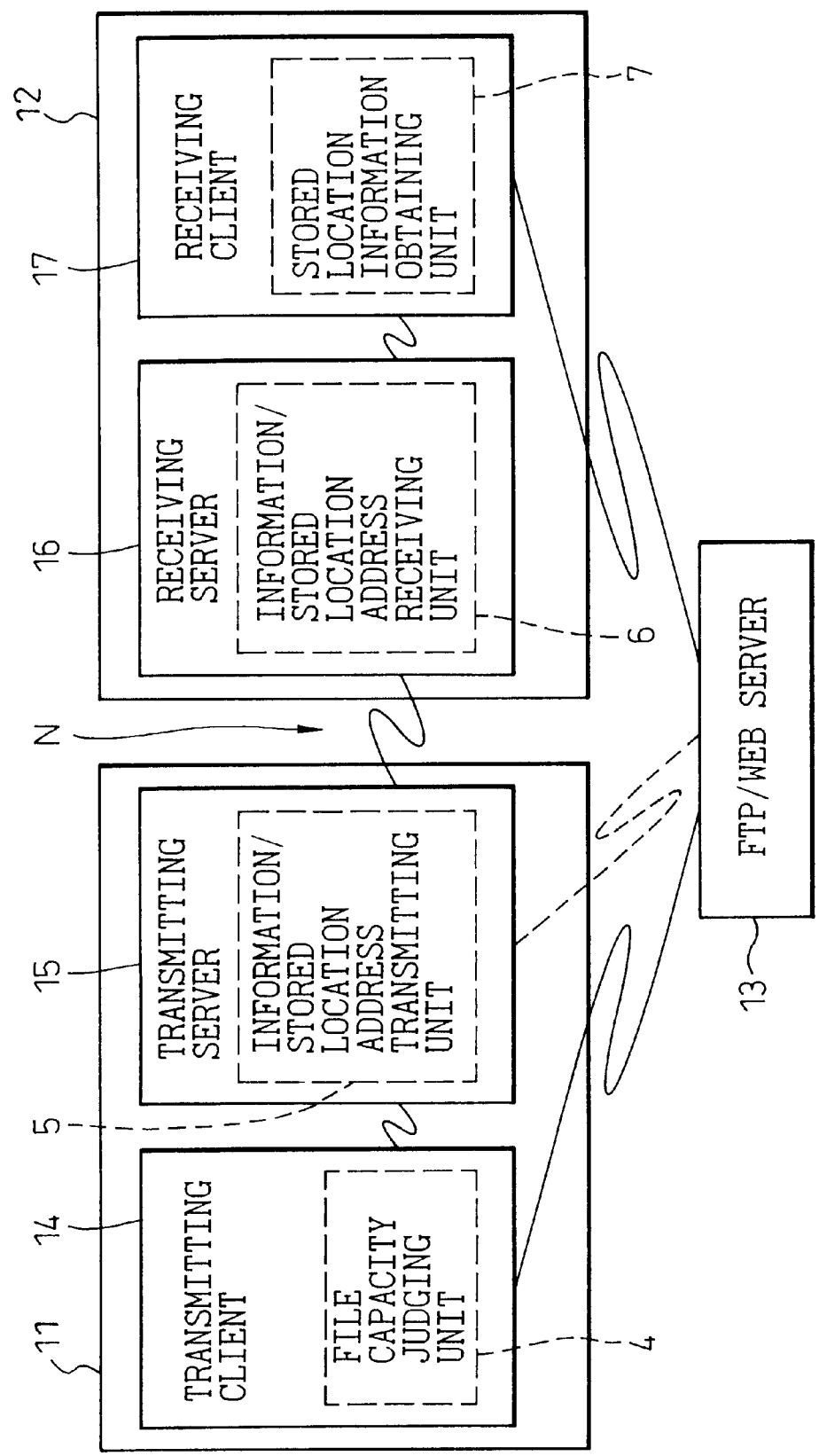
FIG. 2 is a block diagram showing the configuration of a preferred embodiment according to the present invention.
Figure 3:
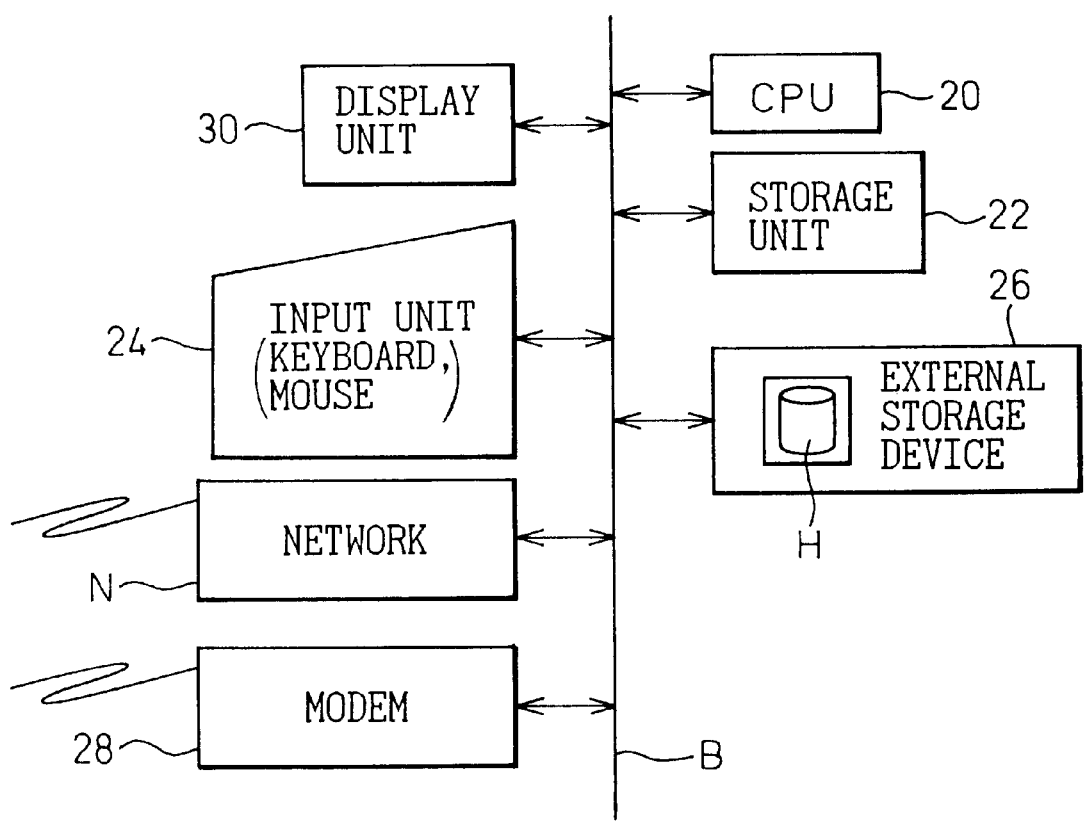
FIG. 3 is a block diagram showing an example of a concrete configuration of a client/server model for the preferred embodiment.

FIG. 2 is a block diagram showing the configuration of a preferred embodiment according to the present invention, and FIG. 3 is a block diagram showing an example of a concrete configuration of a client/server model of this embodiment.

These figures show an example of an information processing system including a plurality of client/server models to which the network information processing system of the present invention is applied. The "client/server model" means a computer system (including both hardware and software) comprising a server for providing several kinds of information, resources, etc., and a client for sending a request to the server to use the information, resources, etc. Further, in these figures, as examples of a network system comprising a plurality of information processing apparatus, such as workstations and personal computers, only two network systems of a first network system 11 and a second network system 12 are typically shown. Hereinafter, components similar to those aforementioned will be described with the same reference numbers.

In FIG. 2, the first network system 11 comprises a client/server model having a transmitting client (corresponding to the mail client at the transmitting end) 14 and a transmitting server (corresponding to the mail server at the transmitting end) 15. On the other hand, the second network system 12 comprises another client/server model having a receiving client (corresponding to the mail client at the receiving end) 17 and a receiving server (corresponding to the mail server at the receiving end) 16. Further, the shared information storing unit 3 shown in FIG. 1 comprises a FTP (File Transmission Protocol)/web server 13 provided on the network N to execute data transfer between different information processing apparatus. This FTP/web server is any server other than the transmitting server and receiving server, which contains a protocol for storing the shared information, by file, which is used commonly between different information processing apparatus.

In more detail, the transmitting server 15 in the first network system 11 executes an e-mail transmission process of either an attached file (data file) which comprises a file including the data which is to be transmitted, or the address, such as the URL, of the location in which the data file is stored (the address of the FTP/web server 13 for this embodiment). The transmitting client 14 requests the transmitting server 15 to execute the transmission process. The file capacity judging unit 4 shown in FIG. 1 is included in either the transmitting client 14 or the transmitting server 15. On the other hand, the information/stored location address transmitting unit 5 is included in either one or both of the transmitting client 14 and the transmitting server 15. In this embodiment, the file capacity judging unit 4 is included in the transmitting client 14, and the information/stored location address transmitting unit 5 is included in the transmitting server 15.

Further, the receiving server 16 in the second network system 12 executes an e-mail receiving process for either the attached file or the address of the stored location transmitted from the transmitting server 15. The receiving client 17 requests the receiving server 16 to execute the receiving process. The information/stored location address receiving unit 6 shown in FIG. 1 is included in at least one of the receiving client 17 or the receiving server 16. The stored location information obtaining unit 7 shown in FIG. 1 is included in the receiving client 17 in FIG. 2. In this embodiment, the information/stored location address receiving unit 6 is included in the receiving server 16.

In the case in which only particular persons are allowed to refer to the file stored in the FTP/web server 13 which is at the stored location, the information/stored location address transmitting unit 5 sets a password and then transmits the password along with the address of the stored location. Further, the storage address information obtaining unit 7 is allowed to access the FTP/web server 13 by using the password which is displayed when the information/stored location address receiving unit 6 has received the address of the stored location.

Below is described each of concrete hardware configurations for the transmitting client, transmitting server, receiving client and receiving server. Each of these four computer systems, the transmitting client, transmitting server, receiving client and receiving server, has substantially the same hardware configuration, and hence the hardware configuration of only one of these computer systems is shown typically below.

The file capacity judging unit 4, information/stored location address transmitting unit 5, information/stored location address receiving unit 6, and stored location information obtaining unit 7 shown in FIG. 1 mentioned before are embodied by the CPU (Central Processing Unit) 20 of the computer system in FIG. 3. In other words, the file capacity judging unit 4, information/stored location address transmitting unit 5, information/stored location address receiving unit 6 and stored location information obtaining unit 7 are embodied by means of software in the computer.

Further, the computer system in FIG. 3 has a program for executing the transmitting process and the receiving process of the information processing system according to the present invention, and a storage unit 22 for storing the data regarding the transmitting process and the receiving process. The storage unit 22 comprises a RAM (Random Access Memory) or a ROM (Read-only Memory). It is also possible to use the RAM or ROM contained in the CPU 20, instead of the storage unit 22.

In more detail, the transmitting process program stored in the storage unit 22 of the transmitting client 14 or transmitting server 15 comprises the step for determining whether or not the capacity of the file including the data which is to be transmitted is larger than the predetermined value, and the step in which the file is transmitted from the transmitting server 15 to the receiving server 16, when it is determined that the capacity of the file which is to be transmitted is the predetermined value or is smaller than the predetermined value but the file is stored in the FTP/web server 13 which is the stored location of the file, and the stored location address is transmitted from the transmitting server 15 to the receiving server 16, when it is determined that the capacity of the file is larger than the predetermined value.

On the other hand, the receiving process program stored in the storage unit 22 of the receiving client 17 or receiving server 16 comprises the step for receiving either the file transmitted from the transmitting server, or the stored location address, and the step for obtaining the file stored in the FTP/web server 13 based on the stored location address.

Further, in this embodiment, in the case in which the computer system in FIG. 3 is operated by using a computer readable storage medium (or recording medium), it is preferable to provide a storage medium (or a recording medium) H, e.g., a hard disk which stores the aforementioned transmitting process program and receiving process program. This storage medium H is driven by the external storage device 26. The storage medium of the present invention is not limited the aforementioned one, but several kinds of storage media to including portable type storage media, such as floppy disk and CD-ROM (Compact Disk Read-only Memory), and any other fixed type storage media, may be used.

Further, in the computer system in FIG. 3, an input unit 24 comprising a keyboard, a mouse, etc., is provided. By operating the keyboard, mouse, etc., the result as to whether or not the capacity of the file which is designated to be transmitted is larger than the predetermined value, and the stored location address such as URL, etc. are stored in the storage unit 22.

In addition, in the computer system in FIG. 3, a display unit 30 is provided for displaying the result as to whether or not the capacity of the file which is to be transmitted is larger than the predetermined value, the stored location address, such as the URL, etc., and the password, etc. which have been set.

The CPU 20, storage unit 22, input unit 24, external storage device 26, and display unit 30 are mutually connected through a bus B. Further, a plurality of computer network systems constituting the transmitting client, transmitting server, receiving client, and receiving server are mutually connected through the network N, such as the Internet, or a telephone line which is connected to a modem 28.

Referring to FIG. 2 again, the operation of the embodiment of the present invention comprising the transmitting client, transmitting server, receiving client, and receiving server is described below.

First, described is the case in which the file capacity judging unit 4 and information/stored location address transmitting unit 5, which most adequately exhibit the features of the present invention, are included in the transmitting client 14. In this case, data transmitting and data receiving are executed according to the following procedures (1) to (6).

(1) The user of the transmitting client 14 designates the file including the data which is to be transmitted. In the transmitting client 14, the application software having the function of the file capacity judging unit 4 determines whether or not the capacity of the designated file is larger than the predetermined value. When it is determined that the capacity of the file is larger than the predetermined value, the file is copied into the FTP/web server 13.

(2) The transmitting client 14 gives the transmission requirement to the transmitting server 15

(3) The transmitting server 15 transmits the e-mail including the stored location address (e.g., URL) of the file.

(4) The receiving server 16 gives the receiving client 17 the notice that it has received the e-mail.

(5) The receiving client 17 receives the e-mail from the receiving server 16.

(6) The receiving client 17 makes access to the FTP/web server 13, in order to refer to the data file which has been copied and stored in the FTP/web server 13.

When data transmitting and data receiving are executed according to the above procedures (1) to (6), only by changing the software of the transmitting client, the transmitting client is allowed to have a function of determining the file size without affecting the existing transmitting server. Thus, the transmitting server is not over-loaded even if the file size is relatively large.

Second, below is described the case in which the file capacity judging unit 4 is included in the transmitting server 15, and the information/stored location address transmitting unit 5 is included in the transmitting server 15. In this case, data transmitting and data receiving are executed according to the following procedures (1)' to (6)'.

(1)' The user of the transmitting client 14 designates the file which is to be transmitted and gives the transmission requirement of the e-mail to the transmitting server 15.

(2)' The transmitting server which has been given the transmission requirement determines whether or not the capacity of the file included in the data which is to be transmitted is larger than the predetermined value. When it is determined that the capacity of the file is larger than the predetermined value, the file is copied into the FTP/web server 13.

(3)' The transmitting server 15 describes the stored location address of the file, instead of the file included in the e-mail received from the transmitting client 14, in the e-mail, and then transmits the e-mail.

(4)' The receiving server 16 gives the receiving client 17 the notice that it has received the e-mail.

(5)' The receiving client 17 receives the e-mail from the receiving server 16.

(6)' The receiving client 17 makes access to the FTP/web server 13, in order to refer to the data file which has been copied and stored in the FTP/web server 13.

When data transmitting and data receiving are executed according to the above procedures (1)' to (6)', the load for the file capacity determination process, etc., of the transmitting client can be reduced by allowing the transmitting client to have a function of determining the file size.

In the basic embodiment and the preferred embodiment according to the present invention described above, the system to which the present invention can be applied is not limited to one using the mail receiving method described in the above embodiments, but may be a system using POP (Post Office Protocol) which is a publicly known protocol. That is, the system may be configured so that the receiving server stores the mail received from the transmitting server in the mail box for the user designated as the destination address, and transmits the received mail to the receiving client according to the user's requirement at the receiving end.

Next, described in detail are the operation procedure for the user at the transmitting end, the flow of the transmitting program, and the operation procedure at the receiving end of the preferred embodiment according to the present invention shown in FIG. 2.

Figure 4:
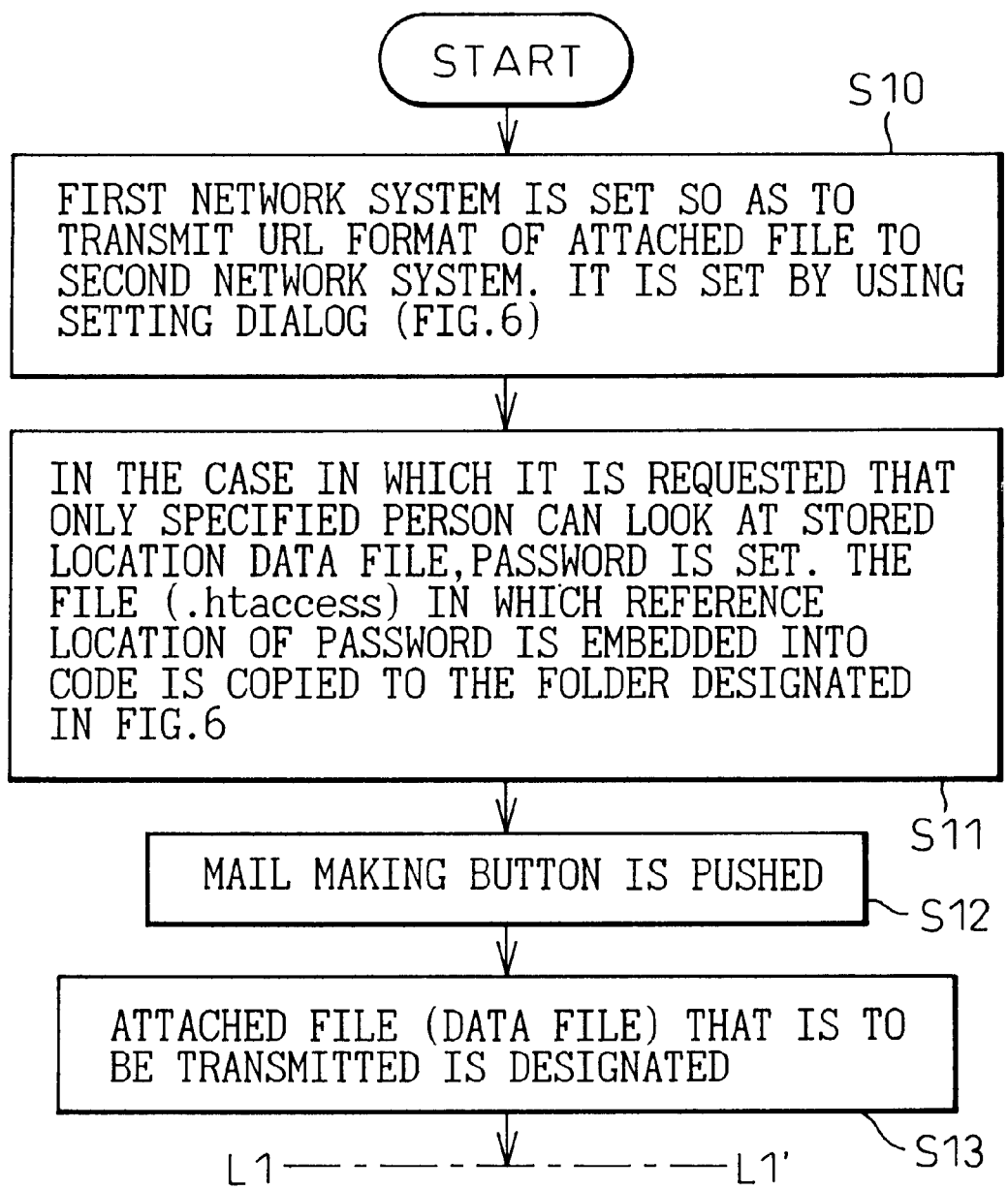
FIG. 4 is a flow chart (1) depicting an operation procedure for the user at the transmitting end of the preferred embodiment.
Figure 5:
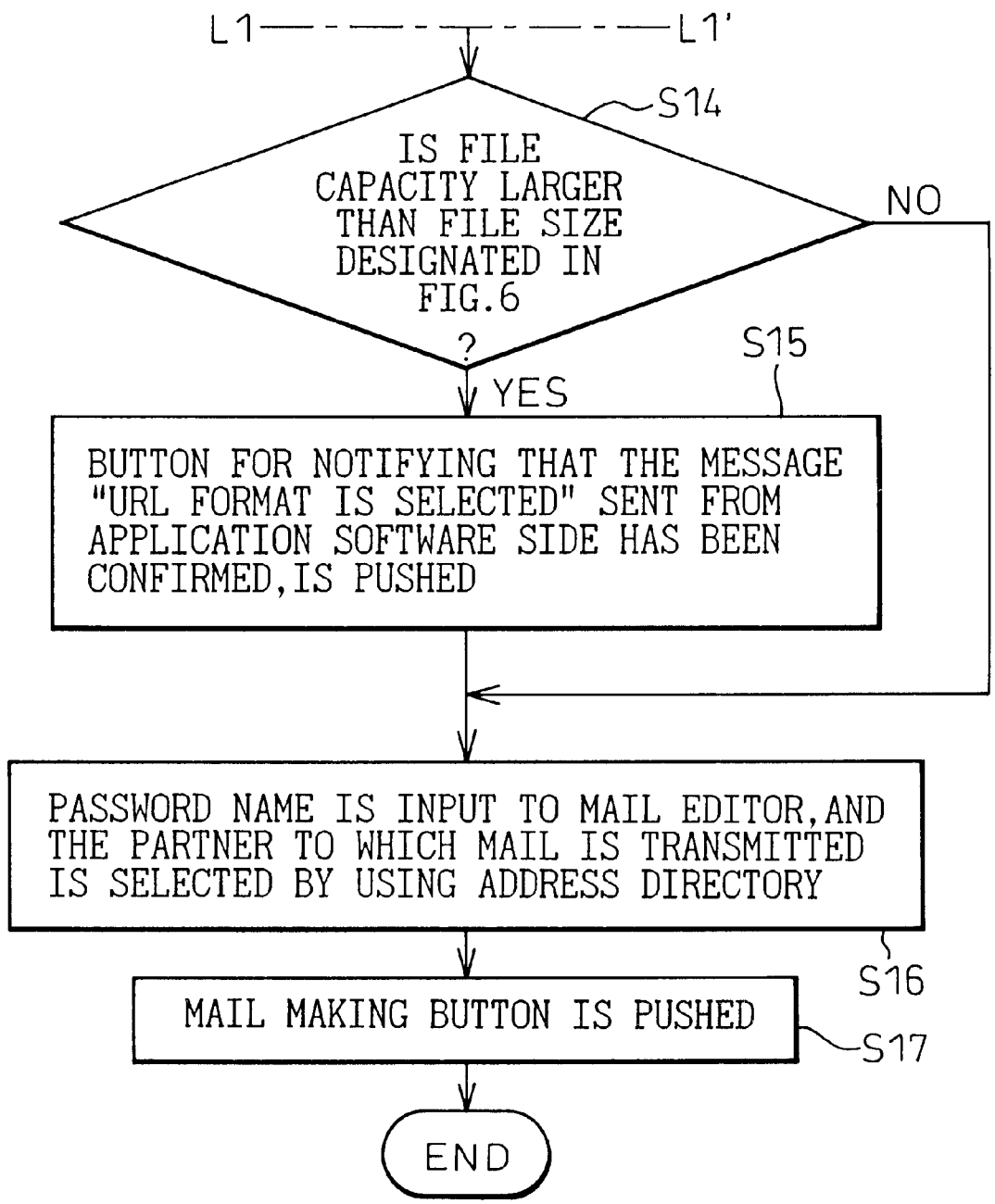
FIG. 5 is a flow chart (2) depicting an operation procedure for the user at the transmitting end of the preferred embodiment.
Figure 6:
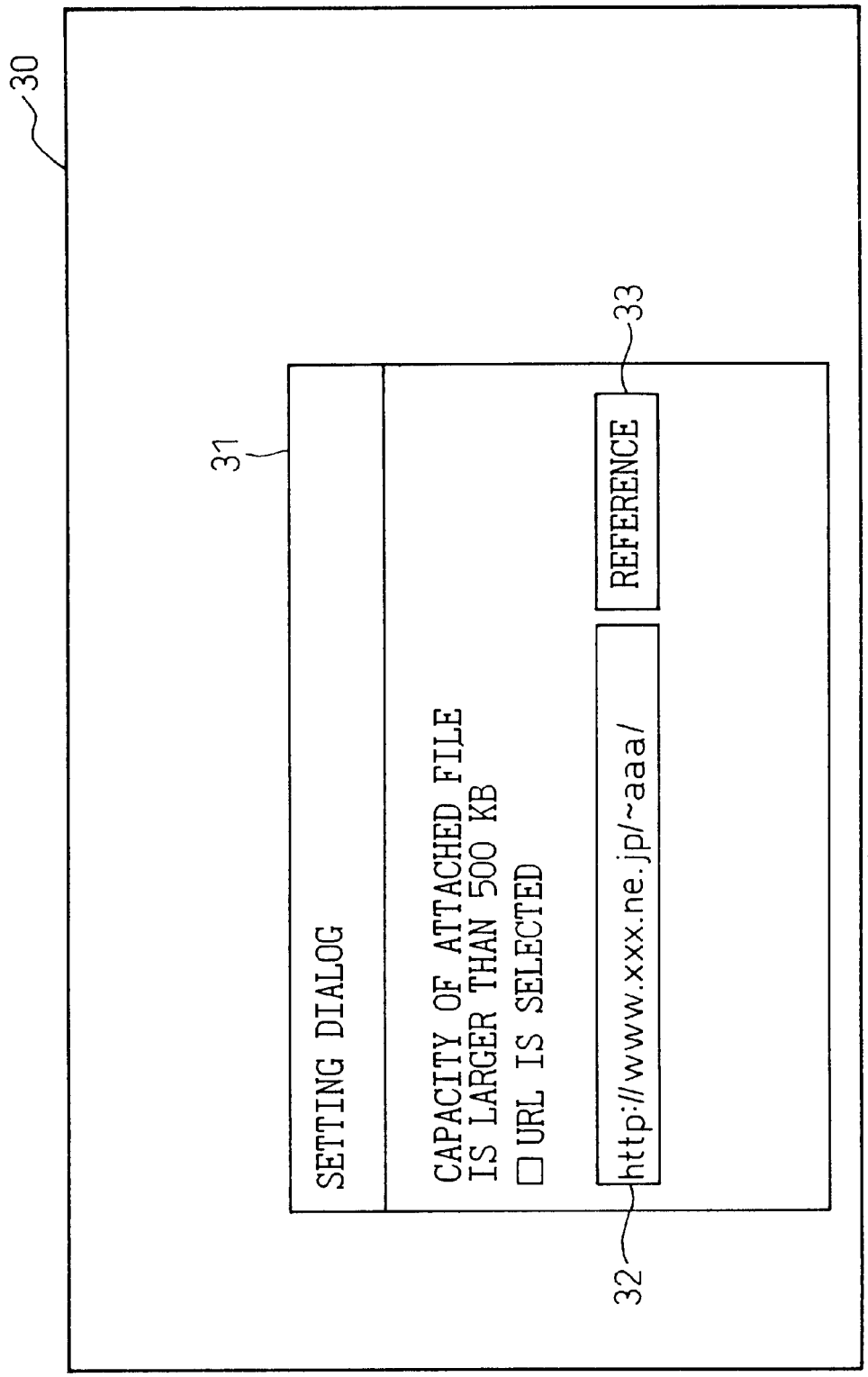
FIG. 6 shows an example of a setting dialog.

FIGS. 4 and 5 are a flow chart (1) and a flow chart (2), respectively, depicting an operation procedure for the user at the transmitting end of the preferred embodiment, and FIG. 6 shows an example of a setting dialog.

When the user at the transmitting end intends to transmit the data from the first network system 11 (user at the transmitting end) (FIG. 2) to the second network system 12 (user at the receiving end) (FIG. 2), the user, as shown in step S10 of the flow chart in FIG. 4, at first makes the setting for transmitting the URL of the attached file automatically when it is determined that the capacity of the attached file (data file) to be transmitted is larger than the predetermined value. The above setting is executed by using the setting dialog 31 indicated on the display 30.

Such a setting operation as in step S10 is executed by the user every time a file attached mail is made, but a setting operation according to the present invention is not limited to the setting operation as in step S10. That is, in the setting operation as in step S10, the setting is not made every time a file attached mail is made, and the setting may be made once, similar to some other setting operations and thereafter, may be changed by the user whenever necessary.

In more detail, as shown in FIG. 6, the application software (transmitting program) of the transmitting client 14 (FIG. 3) determines whether or not the capacity of the attached file is larger than the predetermined file size, and indicates the result of the determination in a setting dialog 31. The user at the transmitting end uses the setting dialog 31 to designate the file size (e.g., 500 KB (kilobyte) or more than 500 KB) which is the reference value at the time of converting the attached file to a URL. In addition, the user at the transmitting end makes the setting of "a URL is selected" and sets the stored location of the file. This stored location of the file can be designated by entering the address of the stored location in an address setting unit 32. Further, the dialog (not shown) showing the list of addresses which can be designated and the directory configuration is displayed, and the stored location of the file can also be designated by designating the required address which is displayed on the dialog.

In other word, when the user at the transmitting end registers the file having a size which is larger than the designated file size, the attached file is converted automatically to the format (e.g., a URL) which can be referred to, and the URL is indicated automatically in the e-mail which is to be transmitted.

Next, in step S11 in FIG. 4, in the case in which the data file at the stored location can be seen only by the specified person, the user at the transmitting end sets the password for referring to the data file at the stored location, and then copies the file (named ".htaccess") having a code in which the password and the location that is to be referred to are embedded, into the folder designated in the setting dialog 31 in FIG. 6.

After that, in FIG. 4, the user at the transmitting end pushes the mail making button (step S12) to designate the attached file (data file) which is to be transmitted (step S13). The attached file which is to be transmitted is designated by a publicly known method. That is, the method using a dialog for designating the attached file, or the method dragging and dropping an icon corresponding to the data file, into the mail making window can be used.

Then, in step S14 in FIG. 5, when it is determined that the capacity of the attached file is larger than the file size designated in FIG. 6, the user at the transmitting end pushes the button for notifying that the message "a URL format is selected" sent by the application software of the transmitting client has been confirmed.

In step S14, if a plurality of files are designated as the attached file, the total capacity of these files may be calculated so as to be compared with the predetermined capacity.

After that, the user at the transmitting end inputs the password to the mail editor and selects a partner to which the e-mail is transmitted by using the address directory (step S16), and then pushes the mail making button to complete the operation for transmitting the e-mail (step S17).

In the case in which the process of the present invention is executed in the transmitting server 15 (FIG. 2), the process is executed as follows.

The transmitting server 15 receives the e-mail from the transmitting client 14 (FIG. 2) and determines whether or not an attached file is included in the e-mail.

When an attached file is not included in the e-mail, the transmitting server 15 sends out the e-mail to the network N (FIG. 2) as it is.

When an attached file is included in the e-mail, at first, the transmitting server 15 decodes the attached file portion of the main part of the e-mail to create a file based on the file name described on the header of the received e-mail and the encoding method of the attached file, and then determines whether or not the capacity of the created file is larger than the predetermined capacity.

When it is determined that the capacity of the created file is larger than the predetermined capacity, the transmitting server 15 transmits the file to the stored location.

After that, the transmitting server 15 deletes the description on the received e-mail showing that the e-mail has an attached file, and deletes the attached file portion of the main part. Then, the transmitting server 15 creates the e-mail which describes the URL comprising the stored location address in which the file has been transmitted to as mentioned above and the file name, and describes the password whenever necessary, and then sends out the e-mail to the network N.

On the other hand, when it is determined that the capacity of the created file is smaller than the predetermined capacity, the transmitting server 15 send out the e-mail received from the transmitting client as it is.

The above embodiment is configured so that the URL comprising the stored location address and the file name is transmitted by using the e-mail to the receiving end, but may be configured so that the URL comprising only the stored location address is transmitted with the e-mail to the receiving end. In this case, when the URL described in the received e-mail is double clicked at the receiving client, the list of the files stored in the location described in the URL is displayed, and then the user at the receiving end reads the files in the list or selects the files which should be stored in the receiving client.

Figure 7:
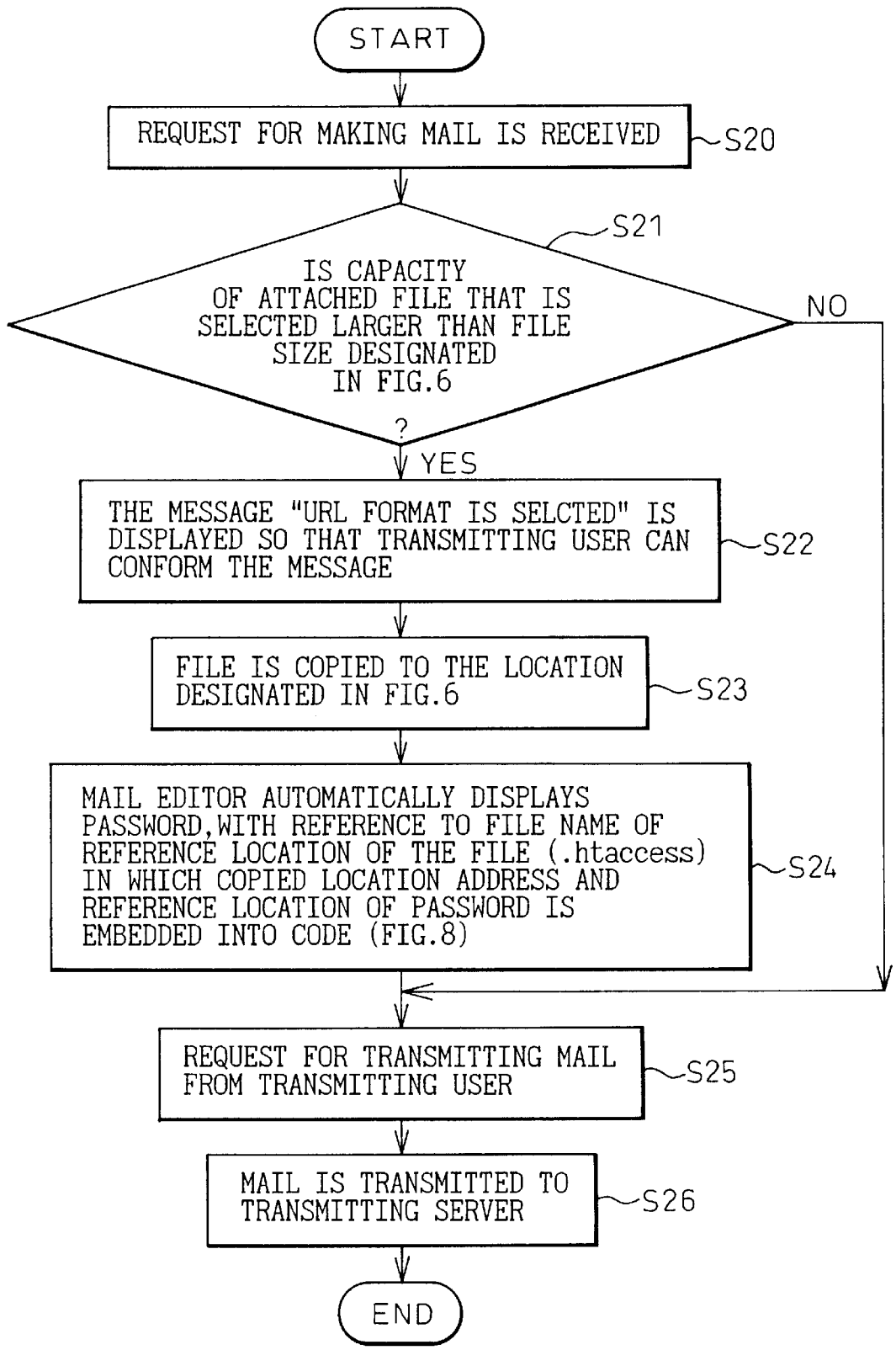
FIG. 7 is a flow chart depicting a flow of a transmitting program of the preferred embodiment.
Figure 8:
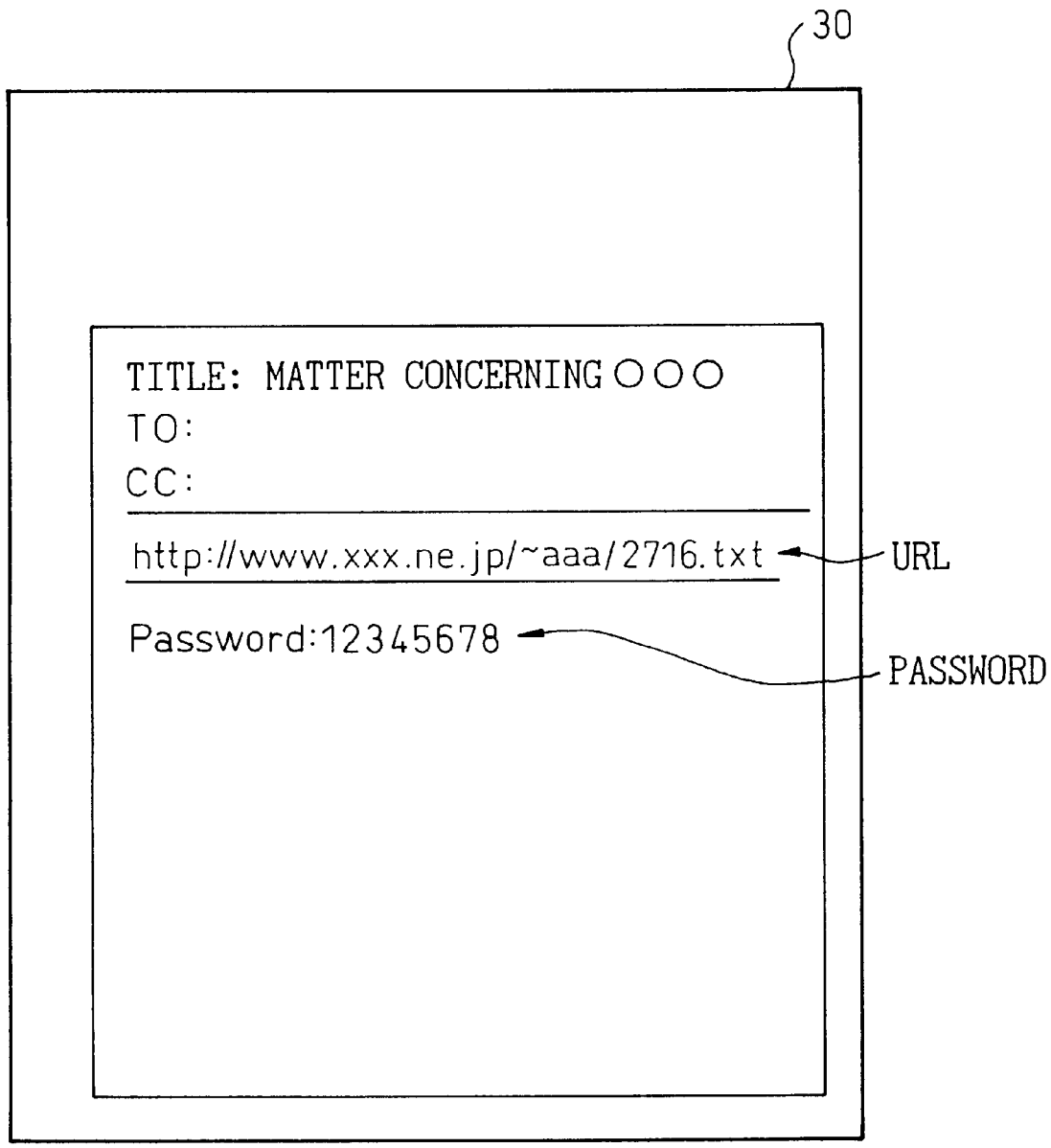
FIG. 8 shows an example of a URL and a password.

FIG. 7 is a flow chart depicting a flow of a transmitting program, and FIG. 8 shows an example of a URL and a password. The flow of the transmitting program executed by the CPU shown in FIG. 3 is described below.

When the data transmission from the first network system 11 (FIG. 2) to the second network system 12 (FIG. 2) is executed, the transmitting program, as shown in steps S20 and S21 in FIG. 7, receives the request for making mail, and determines whether or not the capacity of the attached file is larger than the file size specified in FIG. 6.

When the transmitting program determines that the capacity of the attached file is larger than the specified file size, the transmitting program displays the message "a URL format is selected" as shown in the step S22 in FIG. 7. At that time, the attached file is converted to a URL automatically. The transmitting program then copies the file into the location designated in FIG. 6 (step S23).

After that, in step S24, the mail editor refers to the file name of the reference location of the file (named ".htaccess") having a code in which the location where the file has been copied (stored location address) and the reference location of the password are embedded, and displays the password automatically (step S24). The URL (http - - - ) including the address of the stored location, and the password (12345678) are displayed on the display unit 30 in the form shown in FIG. 8.

Furthermore, in FIG. 7, in response to the request of transmission from the user at the transmitting end (step S25), the transmitting program executes the transmission of the e-mail to the transmitting server 15 (step S26). The transmitting server 15 transmits the e-mail from the transmitting client 14 to the network.

Figure 9:
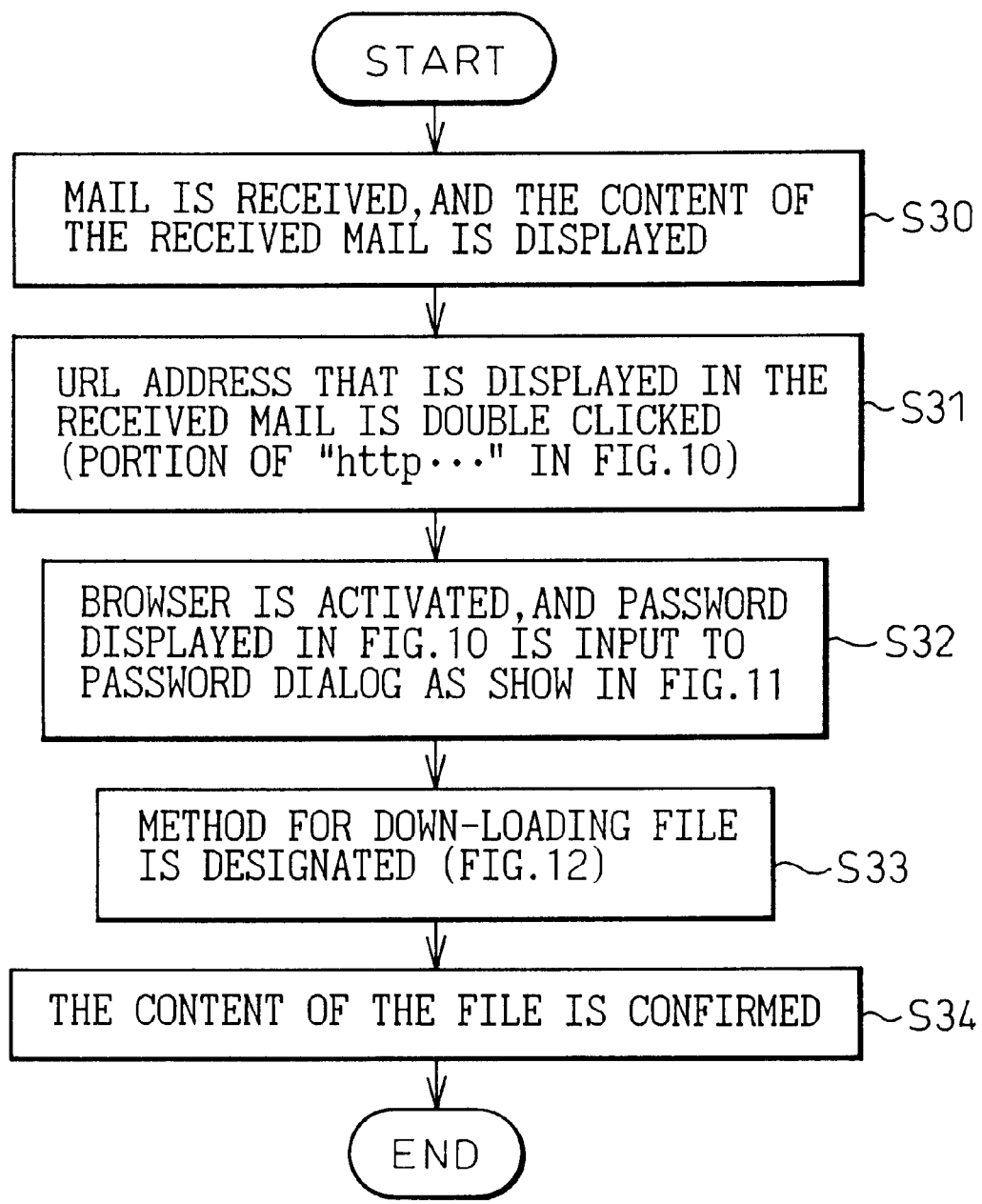
FIG. 9 is a flow chart depicting an operation procedure at the receiving end of the preferred embodiment.
Figure 10:
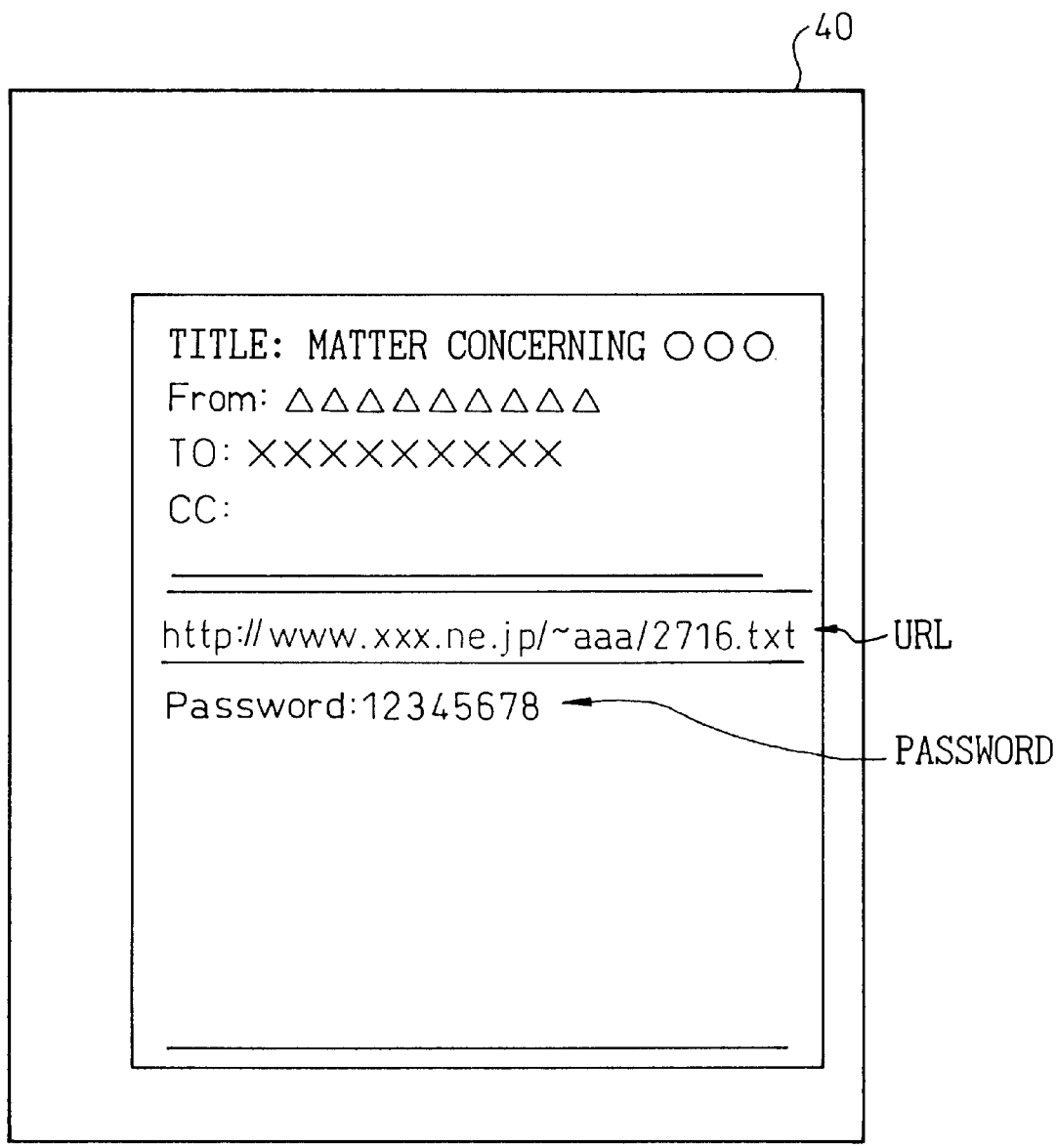
FIG. 10 shows an example of a URL and a password displayed with a received e-mail message.
Figure 11:
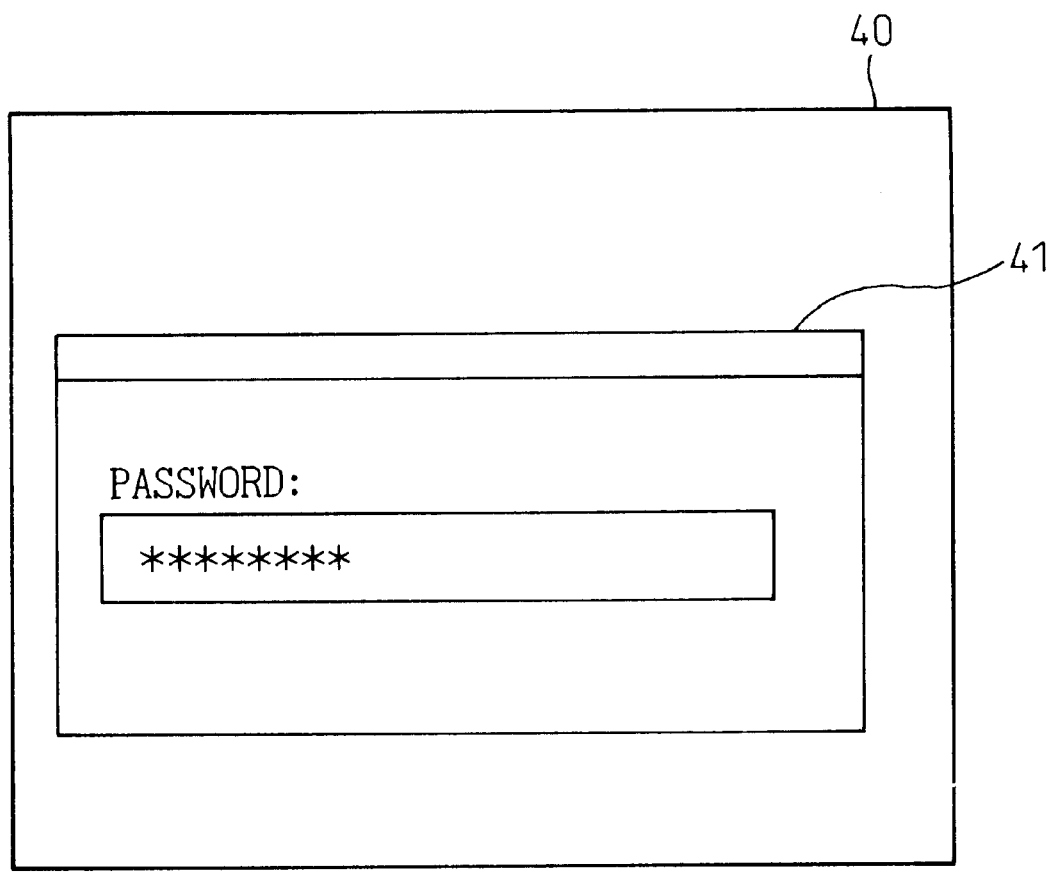
FIG. 11 shows a state in which the password shown in FIG. 10 is inputted.
Figure 12:
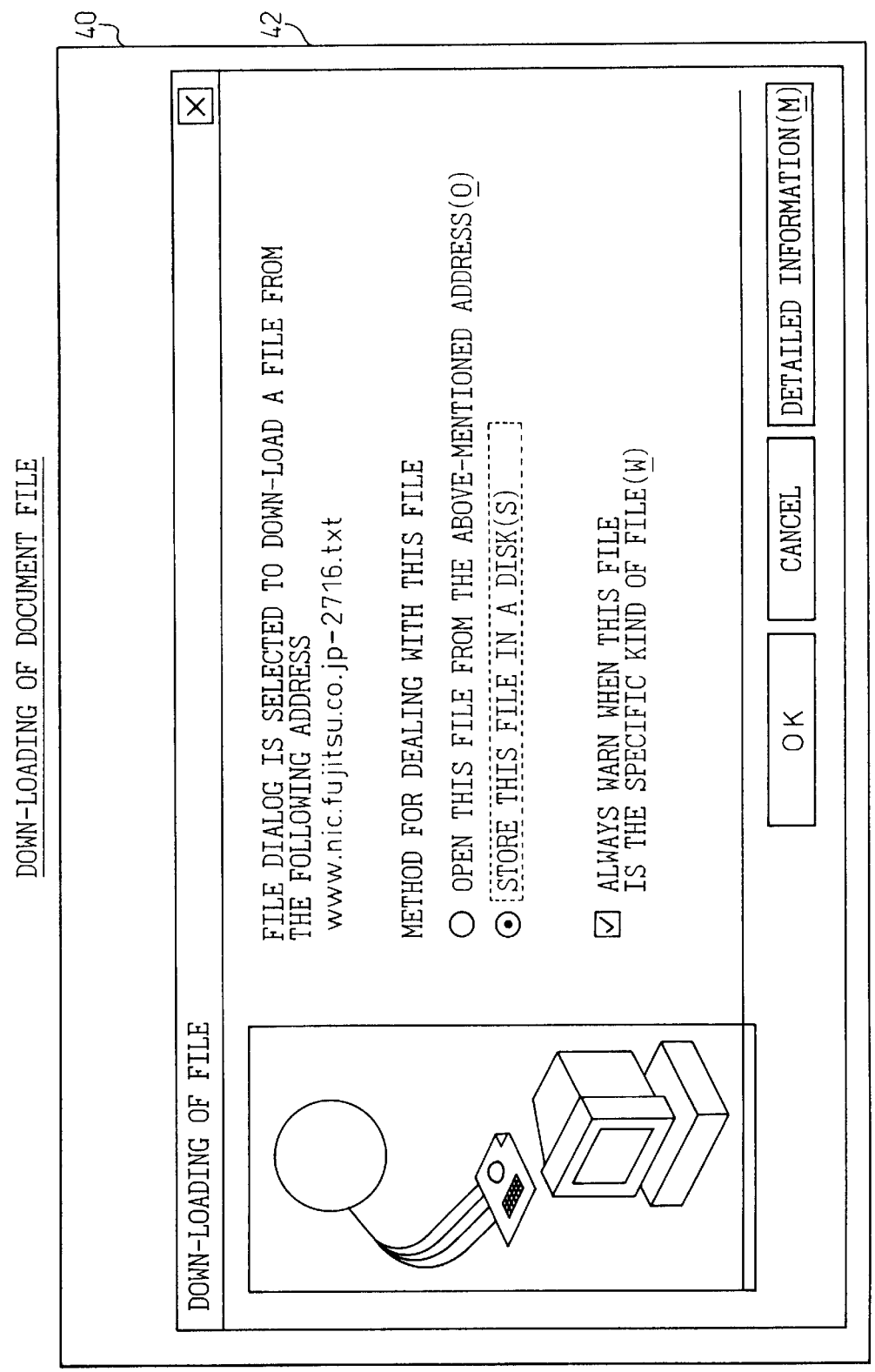
FIG. 12 shows a state in which a file downloading method is designated.
Figure 13:
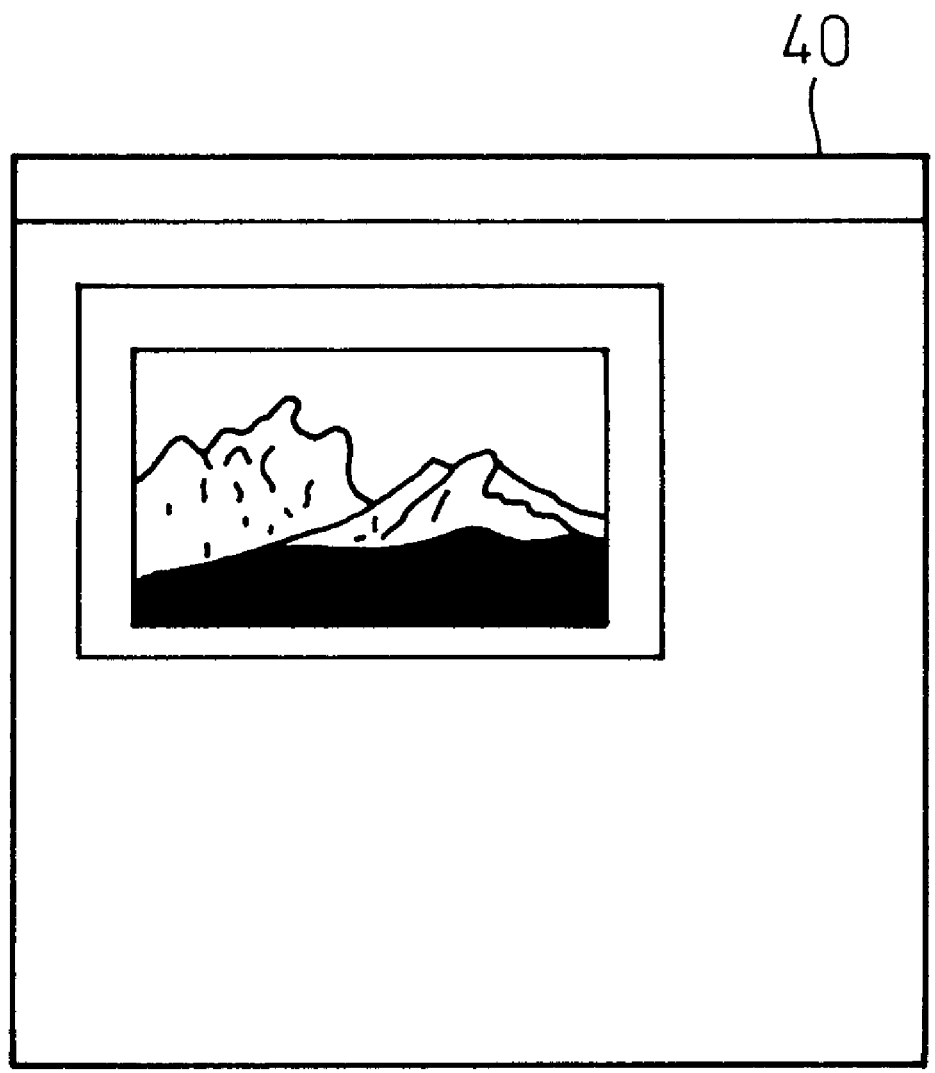
FIG. 13 shows a state in which an image file is displayed.

FIG. 9 is a flow chart depicting an operation procedure at the receiving end of the preferred embodiment; FIG. 10 shows an example of a URL and a password displayed with a received e-mail message; FIG. 11 shows a state in which the password shown in FIG. 10 is inputted; FIG. 12 shows a state in which a file downloading method is designated; and FIG. 13 shows a state in which an image file is displayed.

As shown in step S30 of the flow chart in FIG. 9, the receiving end receives the mail transmitted from the transmitting end. The content of the mail which has been received by the receiving server is displayed on a display unit 40 of the receiving client. Then the user at the receiving end double clicks the URL (http - - - ) displayed on the display unit 40 (step S31). An example of the URL is shown in FIG. 10.

By the above double clicking operation, the browser which is software for viewing the content of the data file, is activated. When the password has been set, the browser displays a password dialog 41 in FIG. 11, and the user at the receiving end inputs the password shown in FIG. 10 into the password dialog 41 (step S32).

The user at the receiving end designates a method for down-loading the file with the file dialog 42 in FIG. 12 (step S33 in FIG. 9), and then confirms the content of the file (step S34 in FIG. 9). In particular, a method for down-loading a document file is designated in FIG. 12. The following methods can be considered as the methods for referring to the file in the stored location.

(A) A Method in Which a Document File is Referred To

In this case, a document file is displayed directly, or, a file dialog for designating the address for the down-loading is displayed.

(B) A Method in Which an Image File is Referred to (see FIG. 13)

(C) A Method in Which a Program File is Referred to

A file dialog for designating the address for the down-loading is displayed.

Further, if it is desired to provide a security function so that only a specified person is allowed to refer to the registered URL, a password can be set. This password is also included automatically in the e-mail which is to be transmitted.

As described above, in the typical embodiments according to the present invention, only when it is determined that the capacity of the file which is to be transmitted is smaller than the predetermined value, the file is transmitted from the transmitting mail server, etc., to the receiving mail server, etc. Therefore, the transmitting mail server or the receiving mail server is not over-loaded due to the capacity of the file. On the other hand, when it is determined that the capacity of the file which is to be transmitted is larger than the predetermined value, the address, such as the URL, of the file stored location is registered automatically, and therefore, it is not required that the address of the stored location is registered manually.

Further, since the address of the file storing location is displayed automatically, an error in the case in which the address of the stored location is input with a keyboard, etc., does not happen, and therefore, no inconvenience, due to a notification error, is caused to the receiving partner.

What is claimed is:

1. An information processing apparatus for transmitting information to a designated destination, said information processing apparatus comprising:
   a file capacity judging unit which determines whether or not a capacity of a file which is designated to be transmitted to the destination is larger than a predetermined value; and
   a transmitting unit which transmits the file to an accessible storing unit and transmits an address of said storing unit to the destination, instead of transmitting the file, when it is determined that a capacity of the file is larger than the predetermined value.

2. An information processing apparatus, as set forth in claim 1, further comprising a first setting unit which previously sets the address of said storing unit, wherein said transmitting unit transmits the file which is designated to be transmitted to the address.

3. An information processing apparatus, as set forth in claim 2, further comprising a second setting unit which sets a password for limiting access to the file stored in said storing unit, wherein said transmitting unit transmits the password to the destination along with the address of said storing unit.

4. An information processing apparatus, as set forth in claim 1, which is connected to a network, wherein transmission of the information is controlled by a mail server connected to said network, and said transmitting unit requests said mail server to transmit the address of said storing unit to the destination.

5. An information processing apparatus, as set forth in claim 1, which is connected to a network and transmits the information received, from a mail client connected to said network, to the destination of the information, wherein said file capacity judging unit determines a capacity of the file which has been included in the information received from said mail client, and said transmitting unit transmits the address of said storing unit to the designation, instead of the file which has been included in the information received from said mail client.

6. An information transmitting method for transmitting information to a designated destination, said information transmitting method including the steps of:
   determining whether or not a capacity of a file which is designated to be transmitted to the destination is larger than a predetermined value; and
   transmitting the file to an accessible storing unit and transmitting an address of said storing unit to the destination, instead of transmitting the file, when it is determined that a capacity of the file is larger than the predetermined value.

7. An information transmitting method, as set forth in claim 6, wherein the address of said storing unit is previously set, and the file which is designated to be transmitted is transmitted to the address which has been set previously.

8. An information transmitting method, as set forth in claim 6, wherein a password for limiting access to the file stored in said storing unit is set, and said password is transmitted to the destination along with the address of the storing unit.

9. An information transmitting method, as set forth in claim 6, wherein the information is transmitted from an information processing apparatus which is connected to a network, and transmission of the information is controlled by a mail server which is connected to the network; and a designation of the file which is to be transmitted, a determination of a capacity of the file, and a transmission of the address of said storing unit, instead of transmitting the file, are executed by said information processing apparatus.

10. An information transmitting method as set forth in claim 6, wherein the information is transmitted from an information processing apparatus which is connected to a network, and transmission of the information is controlled by a mail server which is connected to the network; and said mail server determines a capacity of the file included in the information received from said information processing apparatus; and the address of the storing unit is transmitted to the destination, instead of the file included in the formation received from said information processing apparatus.

11. A computer readable recording medium which stores a program for allowing a computer to execute determining whether or not a capacity of a file which is designated to be transmitted to a destination is larger than a predetermined value, and to execute transmitting the file to an accessible storing unit and transmitting an address of said storing unit to the destination, instead of transmitting the file, when it is determined that a capacity of the file is larger than the predetermined value.

12. A computer readable recording medium, as set forth in claim 11, further allowing the computer to execute setting the address of said storing unit previously and transmitting the file which is designated to be transmitted to the address which has been set previously.

13. A computer readable recording medium, as set forth in claim 11, further allowing the computer to execute setting a password for limiting access to the file stored in said storing unit and transmitting the password to the destination along with the address of said storing unit.

14. A computer readable recording medium, as set forth in claim 11, further allowing the computer to execute designating the file which is to be transmitted, determining a capacity of the file, and transmitting the address of said storing unit, instead of transmitting the file, provided that the computer is connected to a network, and transmission of the information is controlled by a mail server which is connected to the network.

15. A computer readable recording medium, as set forth in claim 11, further allowing the computer to execute determining a capacity of the file included in the formation received from said information processing apparatus, and transmitting the address of said storing unit to the destination, instead of the file included in the formation received from said information processing apparatus, provided that the computer is connected to a network, and transmits the information received from a mail client which is connected to the network, to the destination of the information.

16. A program for allowing a computer to execute determining whether or not a capacity of the file which is designated to be transmitted to a destination is larger than a predetermined value, and to execute transmitting the file to an accessible storing unit and transmitting an address of the storing unit to the destination, instead of transmitting the file, when it is determined that a capacity of the file is larger than the predetermined value.

17. A program as set forth in claim 16, further allowing a computer to execute setting the address of said storing unit previously and transmitting the file which is designated to be transmitted to the address which has been set previously.

18. A program as set forth in claim 16, further allowing a computer to execute setting a password for limiting access to the file stored in said storing unit and transmitting the password to the destination along with the address of said storing unit.

19. A program as set forth in claim 16, further allowing a computer to execute designating the file to be transmitted, determining a capacity of the file, and transmitting the address of said storing unit, instead of transmitting the file, provided that the computer is connected to a network, and transmission of the information is controlled by a mail server connected to the network.

20. A program as set forth in claim 16, further allowing a computer to execute determining a capacity of the file included in the formation received from said information processing apparatus, and transmitting the address of said storing unit to the destination, instead of the file included in the information received from said information processing apparatus, provided that the computer is connected to a network, and transmits the information received, from a mail client which is connected to said network, to the destination of the information.

* * * * *